US006078679A

United States Patent [19]

Yi et al.

[11] Patent Number: 6,078,679

[45] Date of Patent: Jun. 20, 2000

[54] MANUFACTURING METHOD AND READING DEVICE OF INDIVIDUAL INFORMATION PROTECTING CARD BY MULTIPLE IMAGE FREQUENCY TRANSFORMATION

[76] Inventors: Sang Yi Yi, 61-13, Samchung-dong, Jongno-ku, Seoul, Rep. of Korea, 110-230; Kwang Hoon Cha, Hyundai Apartment 112-804, 577, Joongge-dong, Nowon-ku, Seoul, Rep. of Korea, 139-220; Chung Sang Ryu, Bonghwa Villa Ra-201, 98-1, Mook-1-dong, Joongnang-ku, Seoul, Rep. of Korea, 131-141

[21] Appl. No.: 08/690,877

[22] Filed: Aug. 1, 1996

[30] Foreign Application Priority Data

Aug. 7, 1995 [KR] Rep. of Korea ...................... 95-24268

[51] Int. Cl.[7] ...................................................... G06K 9/00

[52] U.S. Cl. ............................................ 382/115; 382/124

[58] Field of Search .................................... 382/115, 116, 382/124, 210, 250, 279, 119, 135; 359/561, 29, 71, 559, 560

[56] References Cited

U.S. PATENT DOCUMENTS

| | | | |
|---|---|---|---|
| 3,677,154 | 7/1972 | Lee et al. | 95/1.1 |
| 3,697,149 | 10/1972 | Van Heeckeren et al. | 350/3.5 |
| 4,588,260 | 5/1986 | Horner | 350/822 |
| 5,029,220 | 7/1991 | Juday | 382/6 |
| 5,050,220 | 9/1991 | Marsh et al. | 382/4 |
| 5,485,312 | 1/1996 | Horner et al. | 359/561 |

OTHER PUBLICATIONS

Optical Engineering, "Optical pattern recognition for . . . ", vol. 33, No. 6, pp. 1752–1756, Jun. 1994.

Optics Letters, "Optical image encryption based on input . . . ", vol. 20, No. 7, pp. 767–769, Apr. 1, 1995.

SPIE, "Noise Performance of Optical Correlators . . . ", vol. 2297, pp. 166–172, May 1994.

SPIE, "Optics for Science and New Technology", vol. 2778, pp. 569–570, Aug. 1996.

*Primary Examiner*—Jose L. Couso

*Assistant Examiner*—Duy M. Dang

*Attorney, Agent, or Firm*—Jacobson, Price, Holman & Stern, PLLC

[57] ABSTRACT

An individual information protecting card is formed by multiple image frequency transformation of the invention is a system utilizing a simplicity of bar cade and an image property of hologram in complexity which is a frequency card being simple in construction. Data to be recorded to the protecting card utilizes an image-based system different from existing numeric cipher code-based system. The image to be used can use not only use a binary image for letters, but also can use continuous grey level as photograph. However, the difference is not in the frequency card exposed externally. Accordingly, expansion to image protecting form is possible and application to a system for managing an information by allocating special image information by individual and by article list is possible. Output of card construction system is made by a reading card possessed by a system operator, a resolution card for increasing of resolution, and user's card being a protecting card. Since the image restoring signal is not produced only by the user's card alone, the image can not be restored from exterior. The image can be restored and seen only when limiting a case inputting a reading card to a key signal. The image can not be restored by a reading card constructed by other image in this case as well. When the resolution card is utilized in response to the case, desired resolution can be obtained.

4 Claims, 3 Drawing Sheets

MANUFACTURING METHOD AND READING DEVICE OF INDIVIDUAL INFORMATION PROTECTING CARD BY MULTIPLE IMAGE FREQUENCY TRANSFORMATION

BACKGROUND OF THE INVENTION

The present invention relates to a manufacturing method and reading device of individual information protecting card by multiple image frequency transformation, and more particularly, to an article made such that individual information protecting card pattern is produced by utilizing a frequency of image and a plural functions are divided to a phase function and an amplitude function whereby each pattern is formed whereby card is made and then the card is read by a digital and optical method so as to be fit to an image frequency card technique application field.

In accordance with fast development of information-oriented society, a concern for individual information management is increased day be day, and a research for identification by utilizing an electric and electronic device in many fields aiming an automatic device or security is briskly progressed. As a method for identifying an individual in an individual certificating system, an information which is customized and increased in exactness of reproducibility as an inherent body information or name as well as an artificially made individual information can be cited. Although it is preferable to utilize an information by nature in an aspect of effect, since it presents in various forms in natural field, data construction and discrimination are very difficult. On the contrary, an artificial information can give exact discriminating ability, but its management is difficult due to damage, burglary, forgery and the like. Accordingly, a necessity of individual information protecting system is earnestly required which is strong against damage, having high discriminant, being impossible to be utilized by other person in case of stolen, and falsification is impossible.

Since one dimentional bar code being a commercialized most simple information among presently utilized artificial informations is less in information recording quantity and easy to reproduce due to its excessive simplicity, it is not suibable for a secret protecting means. As an information being difficult to reproduce, three dimentional hologram attached to credit card can be cited. However, since this is also the information itself is exposed to exterior, reproduction is possible, and there has been a problem that utilization is hard as an individual information due to high manufacturing cost.

OBJECT AND SUMMARY OF THE INVENTION

Therefore, the present invention utilizes a frequency card which simultaneously includes simplicity of bar code and a property of hologram but a reading is difficult. An article recorded by transforming an image to image frequency is said as hologram, and since it has a complex number value, a high resolution film more than a microfilm level is required in minimum for recording, and since an output can not be expressed by a printer, its manufacturing cost is high in case of commercializing. Another feature of frequency has correlation measuring a similarity of two images. An image restoration is impossible by a system generating a peat only when limiting a case where correlated two images are indentical. The present invention has these two properties and a simple recording property as a bar code at the same time, however since an externally exposed signal exhibits correlation value, it is impossible to see by restoring the image at exterior. However, in case of inputing a key signal, it is operated by a hologram whereby the image can be restored and seen, and resolution adjustment is possible. When other signal is inputted from the key signal, the image is not restored.

A feature of the individual information protecting card by multiple image frequency transformation in accordance with the present invention uses an image-based code utilizing code image different from a code-based method using an existing numeric cipher code for information protection. In spite of that, when one dimentional data is interpreted to one dimentional image, one dimentional expression is possible as a bar code. Accordingly, when the protecting card of the present invention is applied to individual information protecting system, an information management of special two dimentional image information is possible as various kinds of credit card including bank card, bill, check, various kinds of deeds as securities, a contracting document, a long term business admission ticket including a short term admission ticket as an invitation card, book and commodity management, a seal and signature recorded as a special image for document transmission requiring a secret. In case of using to one dimention, it can be utilized by allocating a cypher code to a bar code. Therefore, the present invention has an object to make an application to be possible for a field requiring a protection management in an image state for individual information.

In order to accomplish the above object, a reading device of the present invention has a feature for making by optically or digitally dividing a security card such as credit card, identification card and key to system operating person use and client use by utilizing frequency function of fingerprint, seal, signature, letter, photograph and other code image, and reading a card by restoring a hidden image from information of above card.

And, a protecting card manufacturing method in accordance with the present invention has a feature manufacturing for obtaining a basic function by dividing a complex function into a phase and amplitude function and forming each pattern and dividing to a phase and amplitude card so as to be able to use to one dimension and two dimension.

DETAILED DESCRIPTION OF THE PREFERRED EMBODIMENT

Figure 1:
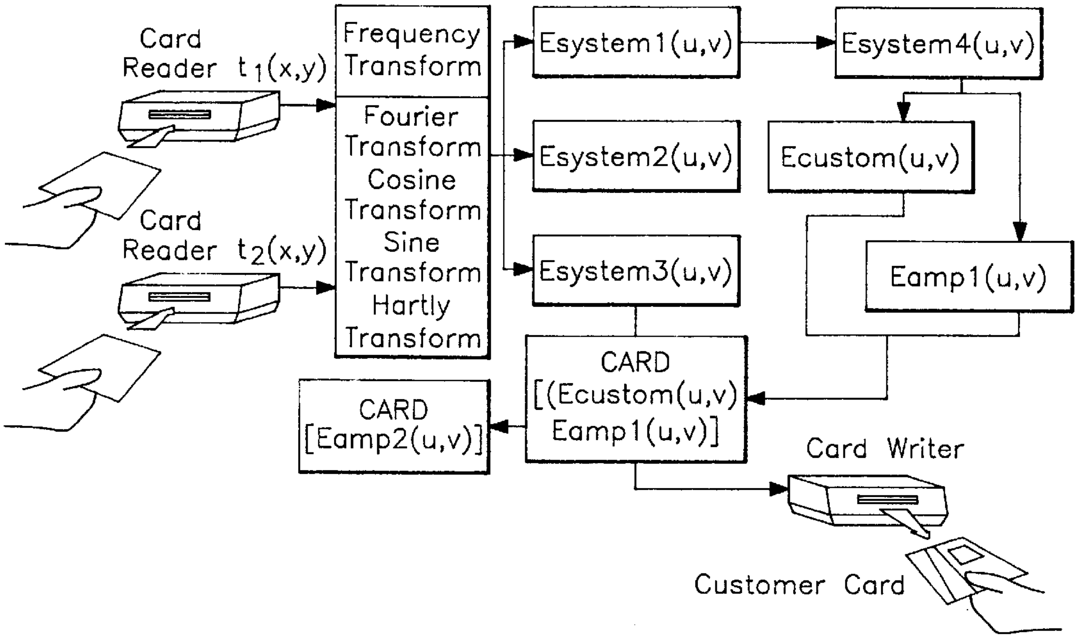
FIG. 1 is a block diagram of the preferred embodiment of the invention for manufacturing an individual information protection card.

In realizing an individual information protecting card by multiple image frequency transformation, a most important component is to obtain a phase value of image frequency for multiple image. The input is made to one dimension and two dimension and realized by dividing in multiple, and the dividing method utilizes by constructing by dividing whole input signal regions or by superposing the divided separate signal region. Since it is difficult to cite the examples for numbers of a case of all dividing and a case for one dimension and two dimension, for a convenience, two of two dimensional signal region two dimensional image planes are made, and when describing a system card realizing method, it will be as fallows.

The image function is appeared as a complete value having a phase and amplitude components in a frequency space. In order to record this, a special method saying as hologram is utilized, and as a recording medium, high resolution film such as microfilm (625 lines/mm) or hologram film (1000–5000 lines/mm) is utilized. Accordingly, it can not but utilizing a high cost equipment in an aspect of manufacturing time cost. On the contrary, a method adopted by the present invention is processed by a complex function by utilizing a frequency property at a manufacturing process as holography, but consequently obtainable output is two real number values. The frequency card provided to a user is a phase value of frequency recorded by binary pattern, and a maker has an amplitude pattern of frequency for resolution increase.

In order to express by such two functions, an input plane of joint Fourier transformation is divided into two stages (for convenience, divided into upper and lower stages), and the upper stage is defined to system key, and lower stage is defined to input key. Assuming that a gap is distanced as much as (δx, δy) between these two keys, the images contained to respective planes can be expressed by following expressions (1) and (2). If intending to attempt multiple stage division, the key images included to following expressions (1) and (2) are selected in many numbers, and in case of one dimension, an identical interpretation is possible only by substituting x-y plane by x plane.

$$P_s(x,y)=k_1(x,y) \tag{1}$$

$$P_i(x,y)=k_2(x-\delta x,\ y-\delta y) \tag{2}$$

wherein, $k_1(x,y)$ represents an image contained within system key plane $P_s(x,y)$, and $k_2(x-\delta x, y-\delta y)$ of above expression(2) represents that $k_2(x,y)$ is divided as much as $k_1(x,y)$ and $(\delta x,\delta y)$ and existed to an input key plane $P_i(x, y)$. An interference intensity distribution obtained by Fourier-transforming the image constructed as above can be expressed by square of Fourier-transformed sum of each plane. Here, when excluding a component unnecessary to system construction, it will be following expression(3).

$$E_{SYSTEM}(u,v)=2|K_1(u,v)||K_2(u,v)|\cos\{\phi_{K1}(u,v)-\phi_{k2}(u,v)-u\delta x-v\delta y\} \tag{3}$$

wherein, $|k_1(u, v)|$ and $|k_2(u, v)|$ are an amplitude components of $K_1(x,y)$ and $K_2(x,y)$ to spatial frequency region, and cosine is a phase component exhibiting distance between images. This is an embodiment for constructing the phase and amplitude function in the present invention.

Method for constructing an embodiment can be processed by following two detailed methods.

Method 1: A method for constructing by utilizing a power spectrum.

Figure 2:
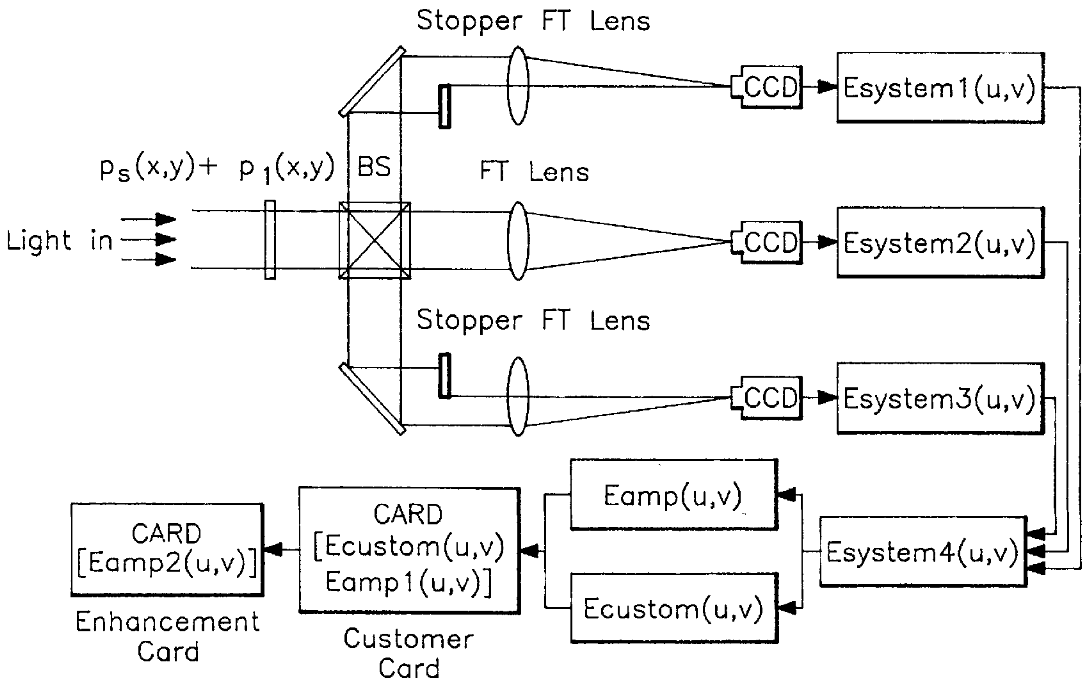
FIG. 2 is an optoelectric system for reading individual information protection cards.

Method 1 is a method suitable for utilizing by dividing one plane, and it is possible to realize by a digital system as shown in FIG. 1 and a photoelectric system as shown in FIG. 2.

For a first process, an interfere strength distribution for the entire input plane is obtained by following expression(4) by joint-Fourier-transform of an image given by above expression(1) and expression(2), and the interfere strength distribution is obtained by following expression(5) and expression(6) by respectively Fourier-transforming the each plane.

$$E_{SYSTEM}(u,v)=|K_1(u,v)||K_2(u,v)|+2|K_1(u,v)||K_2(u,v)\cos\{\phi_{k1}(u,v)-\phi_{k2}(u,v)-u\delta x-v\delta y\} \tag{4}$$

$$E_{SYSTEM}(u,v)=|K_1(u,v)|^2 \tag{5}$$

$$E_{SYSTEM}(u,v)=|K_2(u,v)|_2 \tag{6}$$

For a second process, a result of expression(3) is obtained by eliminating the expression(5) and expression(6) from expression(4). But, in case of being divided, the interfere strength distribution is obtained by Fourier-transforming entire image, and a multiplicity to be divided is combined and joint-Fourier-tranformed, and the interfere strength distribution is obtained by Fourier-transforming respective plane. And, desired few frequency related matters are excluded and rest matters are all eliminated, and this is same principle as obtaining the expression(3) by utilizing above expression(4) and expression(6).

Method 2: A method for obtaining by utilizing complex number.

Method 2 is a system capable of digitally realizing (Configuration of FIG.1), and above expression(1) and expression(2) are Fourier-transformed and multiplied whereby a result of following expression(7) is obtained.

$$E_{SYSTEM4}(u,v)=|K_1(u,v)||K_2(u,v)|\exp\{\phi_{k1}(u,v)-\phi_{ka}1_2(u,v)-u\delta x-v\delta y\} \tag{7}$$

Above expression(7) is a complex function different from the method 1 made by only real number function. Accordingly, above expression(7) can be expressed by a real term and an imaginary term.

$$E_{SYSTEM4}(u,v)=REAL[E_{SYSTEM4}(u,v)]+IMAGE[E_{SYSTEM4}(u,v)] \tag{8}$$

At this moment, when only the real term is taken, it becomes the above expression(3), and when only the imaginay term is taken, the cosine of above expression(3) is changed to sine. These values can be utilized by either taking the real term or by combining two kinds after Fourier-transforming, but it can be directly obtained through the cosine transformation, sine transformation, and Hartly transformation.

In the expressions made by above method 1 and method 2, in order to manufacture a phase card being a user's card, it can be utilized by taking the cosine value. However, since the cosine value has continuous levels, in order to apply to an image card, it should be utilized by quantizing. It is most effective to quantize to two levels among them. Particularly, a quantizing to two levels can bipolarize their values by following expression(9), and this is named as bipolar phase extraction, and it is no concerned to divided stages.

$$E_{CUSTOM}(u,v)=\begin{cases}+1 & E_{SYSTEM}(u,v)>0\\ -1 & E_{SYSTEM}(u,v)<0\end{cases} \tag{9}$$

Although the value appeared to above expression(9) is bipolar value as numeric value, even if −1 is processed to zero, an identical result can be obtained in accordance with system configuration. Firstly, in case where a digital system is utilized as FIG. 1, the expression(9) is recorded by two colors on a plane, but in a reading-out process, 1 can be drawn to one color while −1 can be allocated to another color. In case of utilizing the optoelectronic system as FIG. 2, it will be good when so constructing that a portion corresponding to 1 is relatively delayed in 180° phase than the case corresponding to −1.

In order to increase resolution, the amplitude component is so constructed that only an amplitude component for an image required upon reading is existed. In case when divided to two stages, it is constructed by following expression(10).

$$E_{APM}(u, v) = \frac{|K2(u, v)|}{|K1(u, v)|} \quad (10)$$

Data constructed by expression(10) is not recorded by binary value. Accordingly, in order to apply to the system, a separate of system memory or memorable card is utilized, and two cards are constructed by following expression(11).

$$E_{CARD}(u, v) = \mathrm{CARD}[E_{CUSTOM}(u, v)E_{AMP1}(u, v)]\mathrm{CARD}[E_{AMP2}(u, v)] \quad (11)$$

wherein, $E_{AMP}(u, v)=E_{AMP1}(u, v)E_{AMP2}(u, v)$, and CARD[·] is a function for recording the card. The first card is an input key card given to a customer, and the second card is a system card of system operator.

when k1(x,y) being an image of reading card possessed by system operator for reading from exterior is inputted to a value completed by utilizing above two cards and then multiplied in frequency way, a result of following expression(12) is obtained.

$$E_{OPERATE}(u, v) = |K_2(u, v)|\exp[\phi_{k2}(u, v) + j2\pi(u\delta x + v\delta y)] + |k_2(u, v)|\exp[\phi 2_{k1}(u, v) - \phi_{k2}(u, v) - j2\pi(u\delta x + v\delta y)] \quad (12)$$

In expression(12), the first term is a component capable of restoring $k_2(x,y)$, and the second term is a component in which a phase of k2(x,y) being origin-symmetrized in a form against damaged k1(x, y) is multiplied in frequency way, and it is a component which does not make a form of an image in case of restoring to an image.

Particularly, since these two terms have a distanced position component, they have characteristics of not being superposed even in case of restoring.

Figure 3:
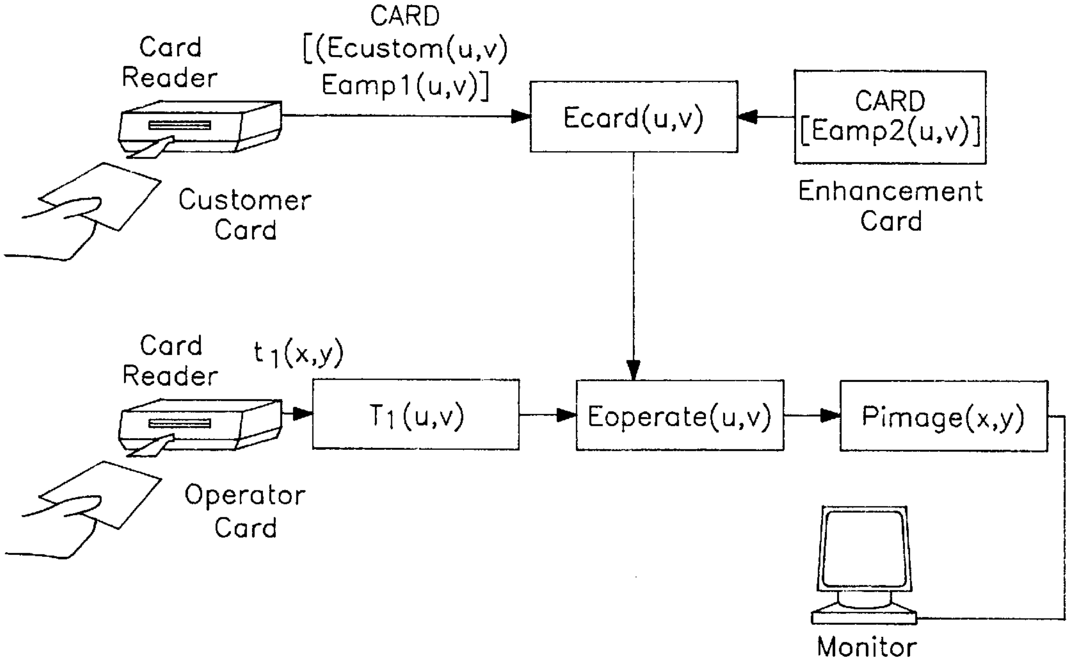
FIG. 3 is a block diagram showing operation of custom operated cards.
Figure 4:
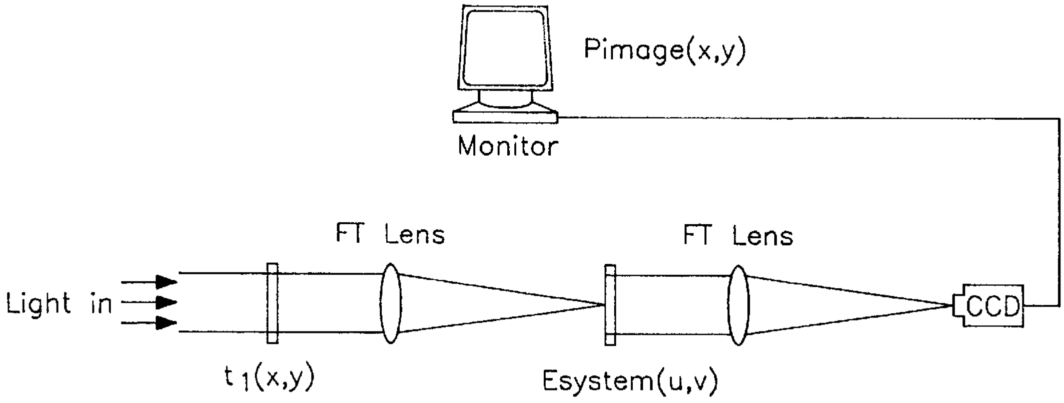
FIG. 4 is a diagram of the card reading device.

Accordingly, when the expression(12) is inverse-Fourièr-transformed and the image is restored in accordance with FIG. 3 and FIG. 4, a restored result as following expression (13) is expressed.

$$P_{IMAGE}(x,y) = k_2(x-\delta x, y-\delta y) + \mathrm{Noise} \quad (13)$$

The expression(13) expressing an image-restored plane exhibits that $k_2(x,y)$ is restored after moving a distance (δx, δy).

For the individual information card utilizing by producing a cipher code via a method for frequency-transforming the image, the input data is made to one dimensional and two dimensional images, and the input system is sought by utilizing the digital and optoelectronic devices. Accordingly, the one dimensional and two dimensional images should be inputted and an input element suitable for the system should be utilized.

Figure 5:
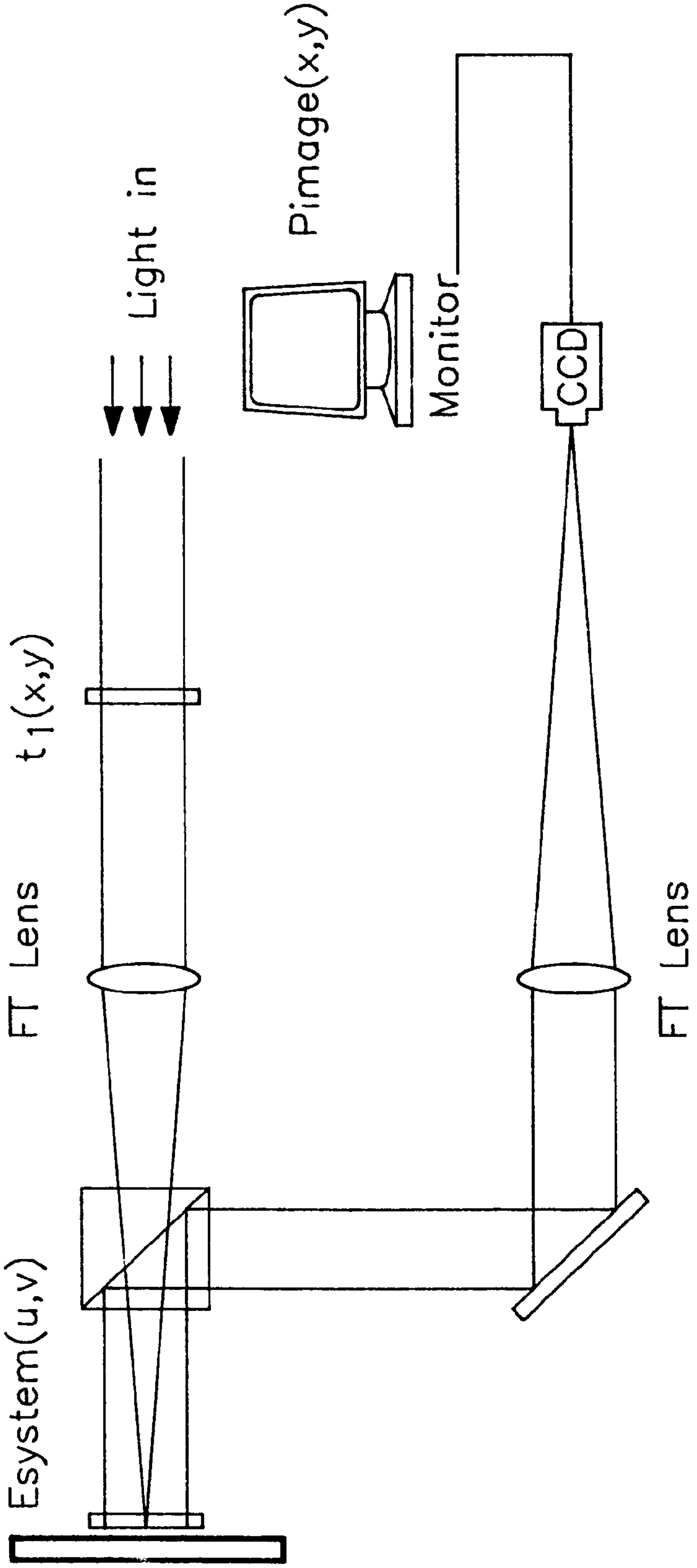
FIG. 5 is a reflecting type card reading device.

The input data of digital system for manufacturing an individual information protecting card (FIG. 1) and optoelectronic system for reading the individual information protecting card (FIG. 2) by a multiple image frequency transformation utilizes general image data inputting device as a scanner and a charge coupled device (CCD) camera for both binary image as a letter and bar code, and continuous level image as photograph. In the photoelectronic system of FIG. 2 and FIG. 4, since the optical device processes the input in transparent form, a light transparent type element as film is used, and in case of utilizing an input device as FIG. 1, transparent type and reflecting type liquid crystal elements capable of displaying an electric image signal are utilized. FIG. 5 is an article that the transparent type card reading device shown in FIG. 4 is re-made to a reflecting type card reading device, and since a part or whole of the individual information protecting card becomes not necessary to manufacture to a transparent type by taking such form, there is advantage capable of adhering or photocomposing the individual information protecting card with maintaining an existing form, as it is, of an object requiring an information protection such as ID card, credit card, document, paper money, and check. As described above, the present invention produces or reads a reading card, resolution card, and user's card to a form suitable for utilizing in a system for reading an individual information protecting card, and since a mutual input among digital-digital, digital-photoelectric, photoelectric-digital, and photoelectric-photoelectric is possible, an output suitable for a system to be used upon manufacturing a card can be produced.

What is claimed is:

1. A manufacturing method of individual information protecting card conspiring the steps of:

(a) placing a multiple image signal and key image signal onto an input plane;

(b) producing a basic complex frequency function obtained by a Fourier transform hologram operation;

(c) dividing the complex frequency function into an amplitude component and a phase component; and (d) recording the amplitude component and the phase component in combination;

wherein the basic complex frequency function is represented by the equation $$E_{SYSTEM}(u,v) = 2|K_1(u,v)||K_2(u,v)| \cos\{\phi_{K1}(u,v) - \phi_{K2}(u,v) - u\delta x - v\delta y\}$$

where $K_1(u,v)$ represents the amplitude of the system key pattern in the frequency domain; and $K_2(u,v)$ represents the amplitude of the system pattern in the frequency domain.

2. A manufacturing method of individual information protecting card comprising the steps of:

(a) placing a multiple image signal and key image signal onto an input plane;

(b) producing a basic complex frequency function obtained by a Fourier transform hologram operation;

(c) dividing the complex frequency function into an amplitude component and a phase component; and (d) recording the amplitude component and the phase component in combination;

wherein the step of dividing the complex function is performed by using the equations $$E_{CUSTOM}(u, v) = \begin{cases} +1 & E_{SYSTEM}(u, v) \geq 0 \\ -1 & E_{SYSTEM}(u, v) < 0 \end{cases}$$

and $$E_{AMP}(u, v) = \frac{|K_2(u, v)|}{|K_1(u, v)|}.$$

3. A manufacturing method of individual information protecting card comprising the steps of:

(a) placing a multiple image signal and key image signal onto an input plane;

(b) producing a basic complex frequency function obtained by a Fourier transform hologram operation;

(c) dividing the complex frequency function into an amplitude component and a phase component; and (d) recording the amplitude component and the phase component in combination;

wherein the step of recording the amplitude component and the phase component in combination is performed using the equation $$E_{CARD}(u,v)=CARD[E_{CUSTOM}(u,v)E_{AMP1}(u,v)]CARD[E_{AMP2}(u,v)].$$

4. The method of claim 3, wherein the function is represented by $$E_{OPERATE}(u,v)=|K_2(u,v)|\exp[\phi_{k2}(u,v)+j2\pi(u\delta x+v\delta y)]+|K_2(u,v)|\exp[\phi 2_{k1}(u,v)-\phi_{k2}(u,v)-j2\pi(u\delta x+v\delta y)].$$

* * * * *